United States Patent
Sato

(10) Patent No.: US 6,747,713 B1
(45) Date of Patent: Jun. 8, 2004

(54) STRUCTURE FOR MOUNTING A LIQUID CRYSTAL MODULE, AND PORTABLE DATA TERMINAL OR INFORMATION PROCESSING EQUIPMENT USING THE STRUCTURE

(75) Inventor: Yasuhiro Sato, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 09/504,998

(22) Filed: Feb. 15, 2000

(30) Foreign Application Priority Data

Feb. 15, 1999 (JP) .......................................... 11-036505

(51) Int. Cl.[7] ........................................... G02F 1/1333
(52) U.S. Cl. ....................................... 349/58; 361/681
(58) Field of Search .............................. 349/58, 59, 60; 361/681; 362/26, 30, 31

(56) References Cited

U.S. PATENT DOCUMENTS

| | | | | |
|---|---|---|---|---|
| 5,844,774 A | * | 12/1998 | Gushiken et al. | 361/681 |
| 5,889,623 A | * | 3/1999 | Ueda et al. | 359/819 |
| 5,946,061 A | * | 8/1999 | Kurihara et al. | 349/58 |
| 6,020,942 A | * | 2/2000 | Yun et al. | 349/58 |
| 6,151,207 A | * | 11/2000 | Kim | 361/681 |
| 6,202,256 B1 | * | 3/2001 | Bovio et al. | 16/382 |
| 6,272,006 B1 | * | 8/2001 | Lee | 361/681 |
| 6,292,239 B1 | * | 9/2001 | Nagamura et al. | 349/58 |
| 6,411,501 B1 | * | 6/2002 | Cho et al. | 361/681 |
| 6,474,823 B1 | * | 11/2002 | Agata et al. | 362/26 |

FOREIGN PATENT DOCUMENTS

| | | |
|---|---|---|
| JP | 55-73970 | 6/1980 |
| JP | 62-137468 | 8/1987 |
| JP | 1-94983 | 4/1989 |
| JP | 3-54983 | 5/1991 |
| JP | 3001011 | 6/1994 |
| JP | 8-234678 | 9/1996 |
| JP | 9-258177 | 10/1997 |
| KR | 94-6282 | 3/1994 |

* cited by examiner

Primary Examiner—Robert H. Kim
Assistant Examiner—David Y. Chung
(74) Attorney, Agent, or Firm—Katten Muchin Zavis Rosenman

(57) ABSTRACT

In a portable data terminal or information processing equipment, a liquid crystal module as a display unit is built-in a cover. Projected portions are disposed at upper and lower edges of the liquid crystal module to be projected in the direction parallel to its display face. Trough-holes are formed in these projected portions in the manner that the holes extend through the portions in the thickness direction of the liquid crystal module. Screw members are inserted into the through-holes from the side of the display face, and tightened to a bottom plate, to connect the bottom plate and an outside frame. This makes it possible to make the cover on which the liquid crystal module is mounted compact.

14 Claims, 13 Drawing Sheets

STRUCTURE FOR MOUNTING A LIQUID CRYSTAL MODULE, AND PORTABLE DATA TERMINAL OR INFORMATION PROCESSING EQUIPMENT USING THE STRUCTURE

BACKGROUND OF THE INVENTION

1. Field of the Invention

The present invention relates to a structure for mounting a liquid crystal module, as a display device, which is mounted on a cover of a portable data terminal or information processing equipment, such as a laptop personal computer or a notebook-type personal computer.

2. Description of the Related Art

As shown in FIG. 1, a liquid crystal module 1 is mounted as a display device on a cover of a laptop personal computer, a notebook-type personal computer or the like. The module 1 is fixed on the cover by inserting screws 2 into screw-inserting portions 1b of the module 1, which are projected from right and left side ends of the liquid crystal module 1 outwardly and parallel to a display face 1a and then driving the screws 2 in fixing portions 3.

In the above-mentioned conventional liquid crystal module 1 fixed on the cover as described above, the area ratio of the display face 1a in the total area of the cover becomes small by the length that the screw-inserting portions 1b are projected outwardly from the side ends. For example, therefore, in the case that the size of the cover is restricted, it is difficult to adopt any liquid crystal module having a large display face. Alternatively, in the case that a liquid crystal module having a large display face is adopted, there arises a problem that the cover becomes large.

Moreover, in the conventional liquid crystal module, the screws are inserted from the display face side in the thickness direction of the cover. Therefore, this liquid crystal module has a problem that the thickness of the cover is decided by the length of the screws satisfying the fixing strength of the liquid crystal module so that the thickness of the cover unfavorably becomes large.

As shown in FIG. 2, therefore, in order to overcome the above-mentioned problem, there is used a liquid crystal module 1, in a side-mount style, whose right and left end faces have screw-fixing portions 4. In the side-mount style, the liquid crystal module 1 is arranged on a lower frame 5 in the state that a display face 1a faces upward, and screws 6 are inserted into through-holes 5a made in a side edge of the lower frame 5. The screws 6 are driven in the screw-fixing portions 4, so that the liquid crystal module 1 is fixed to the lower frame 5 with the screws 6. This causes an improvement about the width in the right and left direction of the cover and the thickness thereof, as compared with the prior art.

As shown in FIG. 3, however, in the liquid crystal module in the side-mount style, it is necessary to separate an outside frame 7 from a back light (B/L) portion 8 by the distance d for a space where the tips of the screws 6 are driven and inserted. Therefore, the width in the right and left directions of the liquid crystal module 1 becomes large, so as to cause a problem that the chassis of the laptop computer gets large. The area ratio of the display face 1a to the total area of the liquid crystal module 1 get s small by the space between the outside frame 7 and the B/L portion 8. Thus, in the case that the liquid crystal module 1 is mounted on the cover, there arises a problem that the area ratio of the display face 1a to the total area of the framework gets small.

As shown in FIG. 4, in the liquid crystal module in the side-mount style, it is necessary that the width D of the screw-fixing portion 4 in the thickness direction has not only the diameter r of the screw 6 but also a length for room, i.e., length (m1+m2). For this reason, the liquid crystal module cannot be made thinner than a given thickness.

Besides, in order to drive a liquid crystal device in the liquid crystal module in the side-mount style, it is necessary to form the screw-fixing portion to keep away from a driver IC (integrated circuit) mounted in the module. Thus, the flexibility of design becomes low. That is, signal lines of the driver IC cannot be laid out into a more appropriate form.

In the cover of the portable data terminal equipment on which a liquid crystal module in the side-mount style is mounted, through-holes through which screws penetrate are formed in parallel to its display face in its lower frame. In the process for producing it, therefore, a slide mold is necessary, so that costs for producing process rise.

In the portable data terminal equipment in the side-mount style, the screw-driving position is present on the end face of the cover. Accordingly, in the case that the liquid crystal module is put on and taken off, working efficiency thereof is lower than in the case that screws are driven from the display face side. Thus, there arises a problem that working efficiency of fabrication falls.

Furthermore, in the portable data terminal equipment in the side-mount style, the through-holes through which the screws penetrate are formed in the side edge having a narrow width. Thus, it is necessary to raise the strength of this side edge. When a metal having a high strength, such as magnesium alloy, is used as low material of the cover in order to improve the strength, costs for the low material rise. Processing efficiency of the molding step drops because of the improved strength. The weight of the cover also increases.

SUMMARY OF THE INVENTION

An object of the present invention is to provide a structure for mounting a liquid crystal module that makes it possible to make compact a cover of a portable data terminal or information processing equipment in which the liquid crystal module is mounted and built as a display unit, the cover being fitted to a body rotatably, and to improve working efficiency upon the assembly of the cover and simplify the production process thereof; and a portable data terminal or information processing equipment on which this structure is mounted.

The structure of a first aspect of the invention comprises a cover that covers at least one face of a body of a computer, and a rectangular liquid crystal module built in the cover, and which is for mounting the liquid crystal module of a portable data terminal equipment on the cover.

The structure comprises: a bottom plate which is put on the back side of a display face of the liquid crystal module, an outside frame which is put on the side of the display face of the liquid crystal module and has an opening from which the display face can be exposed, a projected portion for fitting the liquid crystal module between the bottom plate and the outside frame, the projected portion being made in at least one of upper and lower edges of the liquid crystal so as to be projected in the direction parallel to the display face, a through-hole which is formed in the projected portion and extends through the projected portion in the thickness direction of the liquid crystal module, and a connection portion which is formed in the bottom plate and the outside frame and connects the two through the through-hole.

In this liquid crystal module, the projected portion is formed in at least one of the upper and lower edges of the liquid crystal so as to be projected in the direction parallel to the display face, and the through-hole is formed in the projected portion to extend through the projected portion in the thickness direction of the liquid crystal module. The bottom plate and the outside frame are connected to each other through this through-hole, so that the liquid crystal module, the bottom plate and the outside frame are integrated with the cover of the body of the computer. It becomes unnecessary to make screw-fixing portions or the like at right and left edges of the liquid crystal module as seen in the side-mount style. For this reason, the width in the right and left direction of the liquid crystal module can be made small. It is also unnecessary that any screw-fixing portion is made at the side faces of the bottom plate and the outside frame, so that the width in the right and the left direction of the chassis can be made small. Moreover, it is unnecessary to make any screw-fixing portion, such as shown in FIG. 14, at the liquid crystal module, so that it is also unnecessary to lay out signal wiring of a driver IC to keep away from such a screw-fixing portion. Thus, it is possible to lay out the wiring in a form appropriate for liquid crystal display.

Therefore, the area ratio of the display face in the total area of the liquid crystal module gets large, so that the area ratio of the display face in the total area of the cover also gets large. This makes it possible to keep the display face larger even when the size of the cover is restricted. Alternatively, when the liquid crystal module whose display face is large is adopted, the cover can be made small. In such a manner, the size (including dimension of the external form and thickness) of the cover can be made small.

By connecting the liquid crystal module, the bottom plate and the outside frame through the through-hole made in the projected portion, it is possible to perform working from the side of the display face upon the assembly of the cover. This makes it possible to improve working efficiency.

Moreover, it is unnecessary that any screw-fixing portion is made at the end face of the cover as seen in the prior art. Accordingly, in the process for producing the bottom plate and the outside frame, it is unnecessary that these are molded with the upper and lower molds and subsequently the step of sliding the molds is performed. Thus, the number of the molding steps gets fewer. This makes it possible to improve working efficiency and simplify the producing process, thereby reducing producing costs.

When a notebook-type personal computer is kept in the state that it stands vertically in a bookshelf, it is desired that the height thereof is consistent with that of a document (for example, the long side of A4 size paper). That is, the width in the right and left direction of the chassis is restricted, and as the ratio of the display face is higher within this restriction, its screen is easy to see. In the side-mount style in the prior art, the ratio of the display face is restricted on the basis of the size necessary for fixing screws. On the other hand, in the present embodiment, the width of the outside frame can be made short (thin) so that the ratio of the display face can be made higher. It is therefore possible to obtain a portable data terminal equipment wherein its screen is easy to see.

If the position where a screw member is tightened in the lower edge of the cover is set in a spatial area of a spot where a hinge metal member is fitted, the screw-tightening area does not get large. Thus, the cover does not get large. If the position where a screw member is tightened in the upper edge of the cover is set in a spatial area of a spot beside a hook for keeping the computer body and the cover in a closed state, the screw-tightening area does not get large. Thus, the cover does not get large.

Moreover, it is unnecessary that any screw-fixing portion is made at the end face of the cover, so that the bottom plate and the outside frame can be molded from a resin only by moving upper and lower molds in the vertical direction once. Thus, after the molding with the upper and lower molds, the step of sliding them is unnecessary, so that the number of the molding steps gets fewer. This makes it possible to simplify the producing process and reduce assembling costs.

The structure for mounting the liquid crystal module of a second aspect of the invention is the structure according to the first aspect, wherein a reinforcing member is fitted to the liquid crystal module along its edge and the projected portion is formed in the reinforcing member.

In this structure for mounting the liquid crystal module, the reinforcing member is formed in the liquid crystal module along its edge and the projected portion is formed in the reinforcing member. In this way, the liquid crystal module is connected to the bottom plate and the outside frame, so that the rigidity in the face direction of the liquid crystal can be made high.

The structure for mounting the liquid crystal module of a third aspect of the invention is the structure according to the first or the second aspect, wherein either one of the upper and lower edges of the liquid crystal module is sandwiched between the bottom plate and the outside frame to be fixed.

In this structure for mounting the liquid crystal module, either one of the upper and lower edges of the liquid crystal module is put between the bottom plate and the outside frame to be fixed. In this way, positions where connection portions are made are reduced by half, so that areas where they are made are reduced. Thus, the chassis can be made smaller.

The structure for mounting the liquid crystal module of a fourth aspect of the invention is the structure according to any one of the first to third aspects, wherein the connection portion has a projected portion that is disposed at one of the bottom plate and the outside frame and fitted into the through-hole, and a connection portion that is disposed at the other of the bottom plate and the outside frame and is connected to the projected portion.

In this structure for mounting the liquid crystal module, the liquid crystal module is engaged with the projected portion upon the assembly of the cover. In this way, it becomes easy to fit the position of the liquid crystal module to the bottom plate. Thus, working efficiency can be improved.

The structure for mounting the liquid crystal module of a fifth aspect of the invention is the structure according to any one of first to fourth aspects, which comprises a screw member that is inserted from either one of the bottom plate and the outside frame so as to be tightened to the other.

In this structure for mounting the liquid crystal module, the screw member can be tightened from the display face side of the liquid crystal module upon the assembly of the cover. Thus, working efficiency can be improved. If the hinge member is also fixed with the screw member, the number of the assembly steps gets fewer to improve working efficiency. Moreover, the strength of a portion for fixing the hinge member is heightened, and the hinge portion cannot easily be broken even when forcible opening and shutting are performed.

The portable data terminal equipment of a sixth aspect of the invention is a portable data terminal equipment wherein a liquid crystal module is mounted on the cover by means of the structure for mounting the liquid crystal module according to any one of the first to fifth aspects.

This portable data terminal equipment, itself, including the cover can be made compact by making the cover compact. Moreover, it is possible to improve working efficiency in the production process and simplify the production process. In this way, production costs can be reduced.

DETAILED DESCRIPTION OF PREFERRED EMBODIMENTS

Preferred embodiments of the present invention will be specifically described, referring to the attached drawings.

FIGS. 5 to 9 show a structure for mounting a liquid crystal module according to a preferred embodiment of the present invention, and a portable data terminal equipment on which this structure is mounted.

Figure 1:
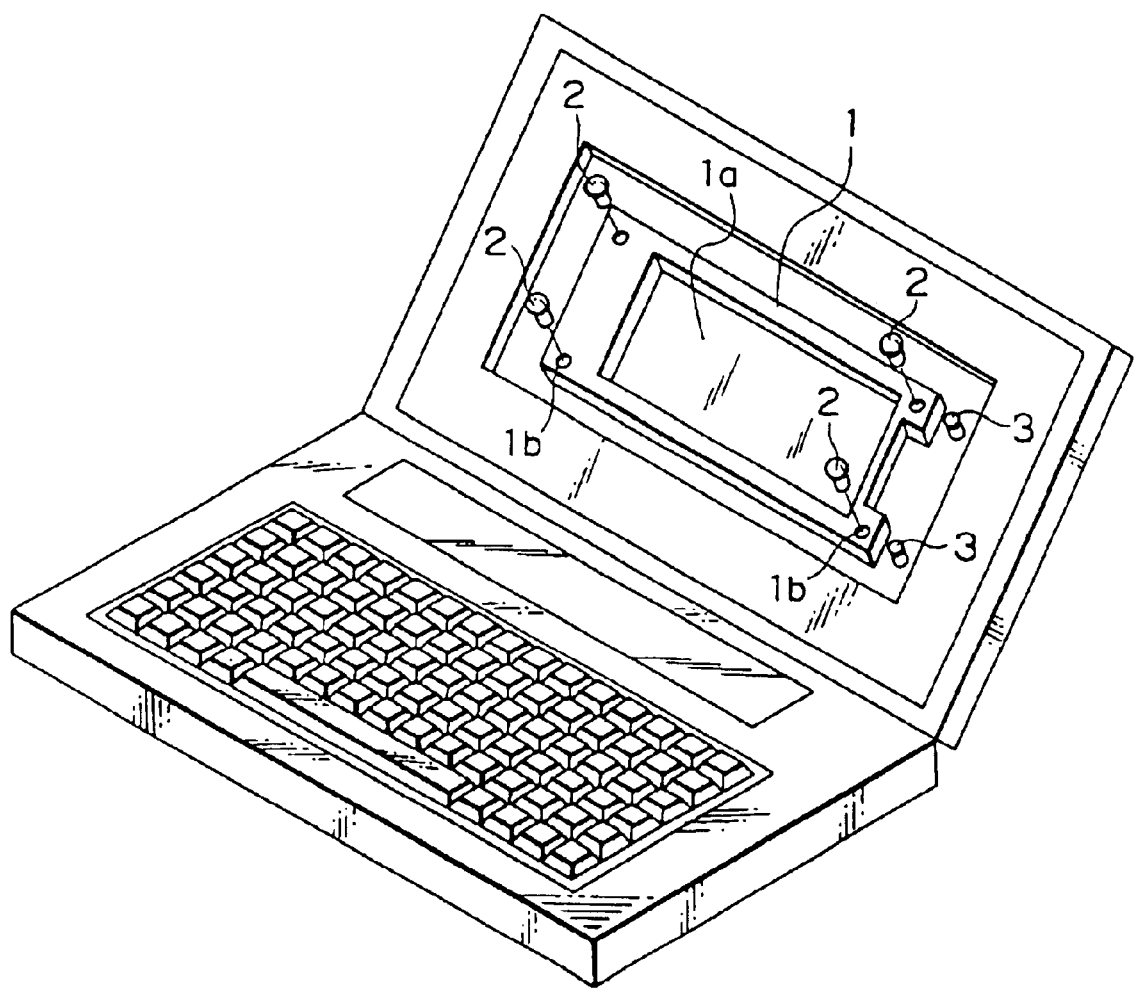
FIG. 1 is a disassembly view of a cover that a conventional portable data terminal equipment has.
Figure 2:
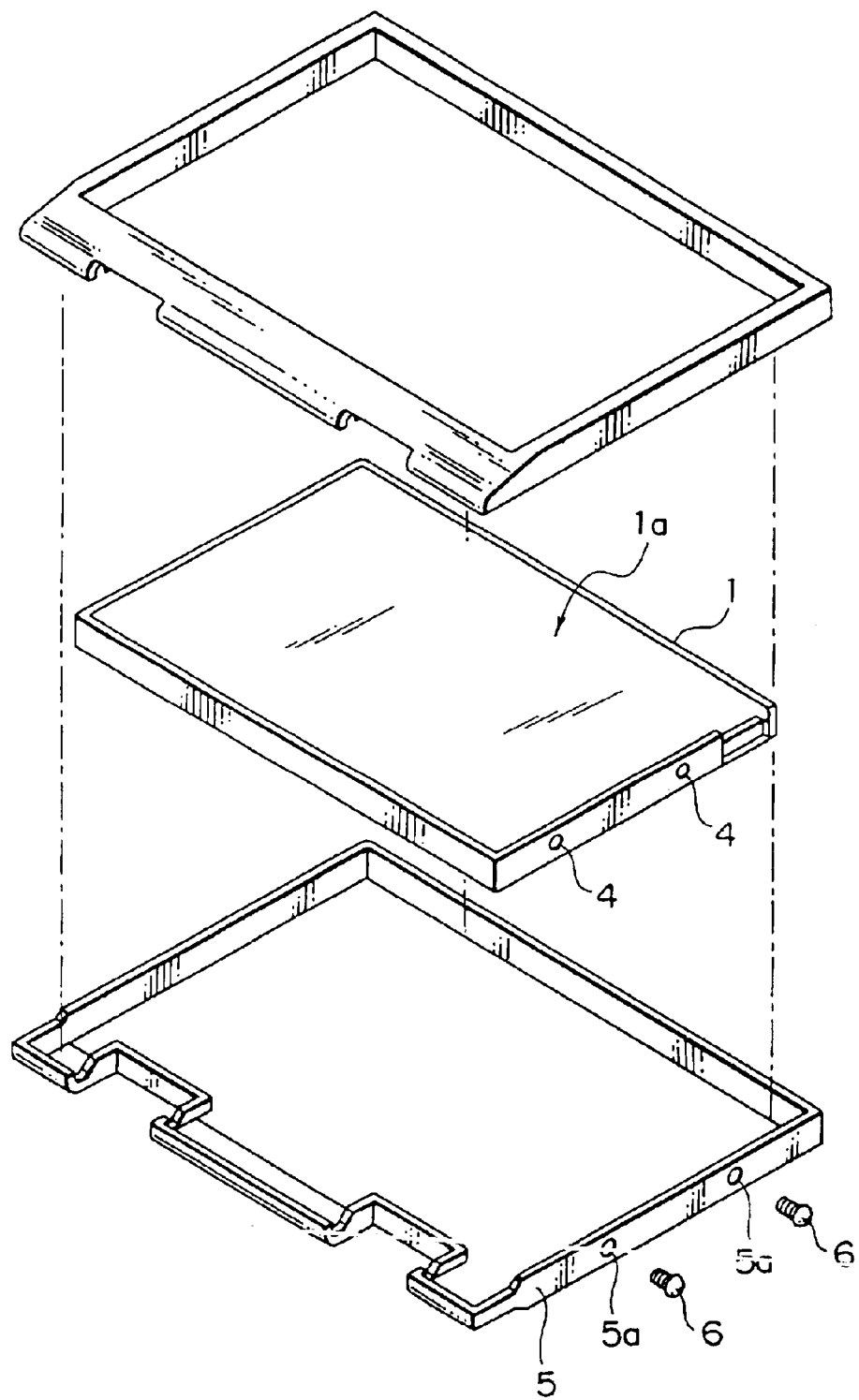
FIG. 2 is a disassembly view of a cover having a liquid crystal module in a side-mount style in another conventional portable data terminal equipment.
Figure 3:
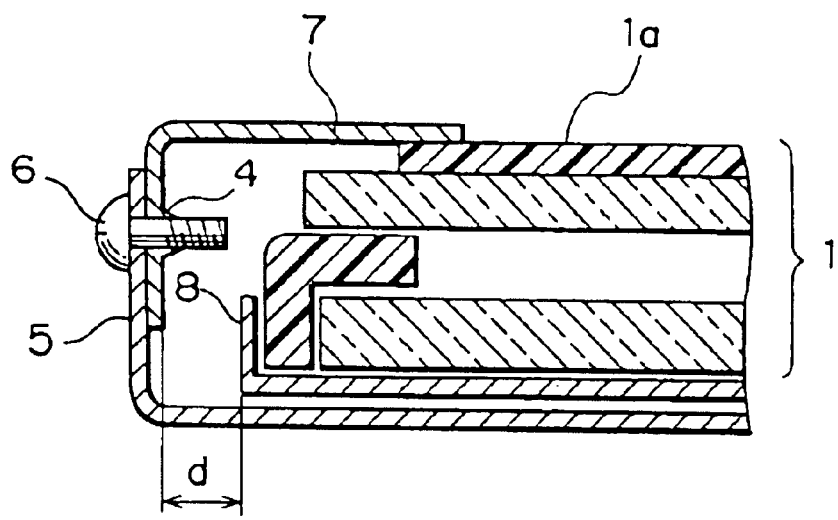
FIG. 3 is a sectional view of a main portion of a cover having a liquid crystal module in a side-mount style.
Figure 4:
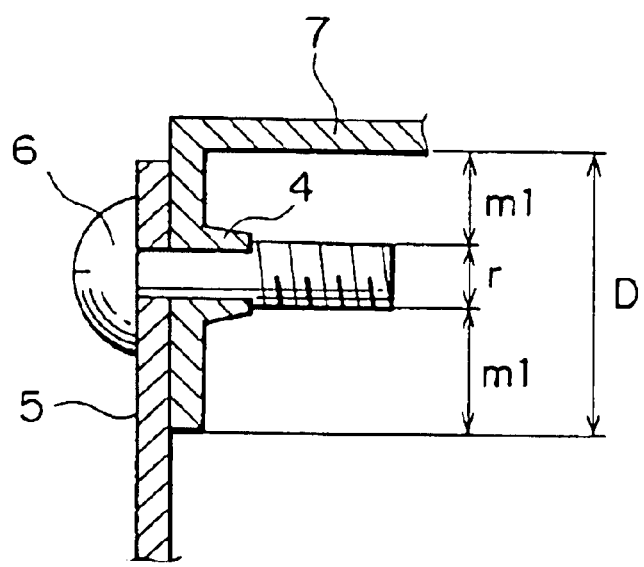
FIG. 4 is a sectional view of a main portion of the cover having the liquid crystal module in the side-mount style.
Figure 5:
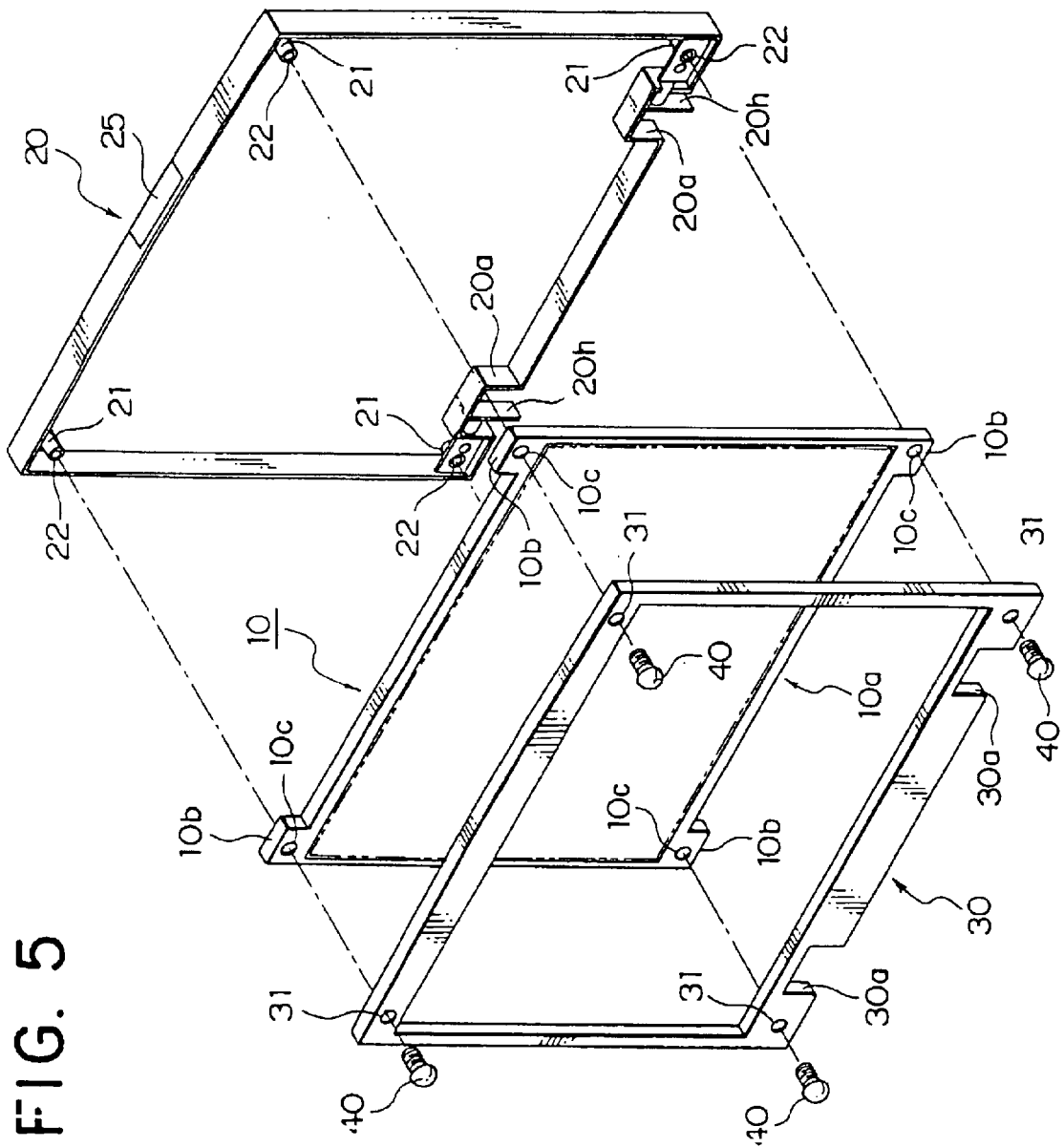
FIG. 5 is a view showing a first embodiment of the present invention, and is a perspective disassembly view of a cover, with a built-in display device, which a portable data terminal equipment has.

FIG. 5 is a perspective disassembly view of a cover, with a built-in display device, which a laptop computer (portable data terminal equipment) has. In FIG. 5, reference numbers 10, 20 and 30 represent a liquid crystal module, a bottom plate constituting a part of the cover, and an outside frame constituting a part of the cover, respectively. Each of the bottom plate 20 and the outside frame 30 is made of a plastic. The liquid crystal module 10 is mounted between the bottom plate 20 put on the back face a display face 10a and the outside frame 30 arranged along the periphery of the display face 10a, and is fixed to the cover by connecting the bottom plate 20 and the outside frame 30 by means of a connection portion described later.

Figure 6:
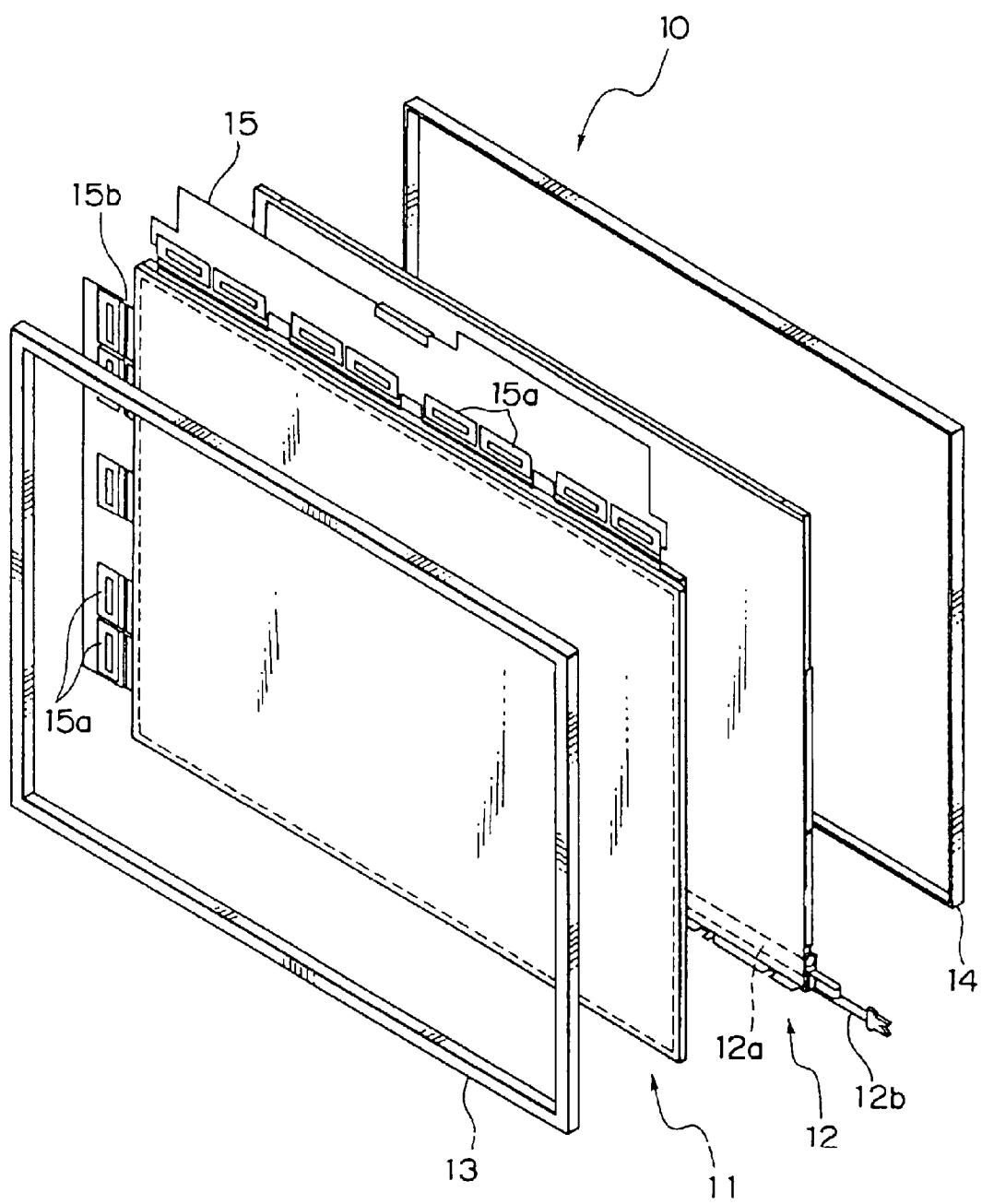
FIG. 6 is a perspective disassembly view of a liquid crystal module constituting the cover shown in FIG. 5.

FIG. 6 is a perspective disassembly view of the liquid crystal module 10. In FIG. 6, reference numbers 11, 12 and 13 represent a liquid crystal device (LCD) panel, a back light (B/L) unit and a front side frame, respectively. Reference numbers 14 and 15 represent a backside frame and a printed wiring board, respectively.

The LCD panel 11 is put on the B/L unit 12 in the manner that fourth sides of the former are consistent with those of the latter. They are held between the front side frame 13 and the backside frame 14, both of which are made of a metal, and fixed. Both of the front side frame 13 and the back side frame 14 are combined to cover and hide all end faces of the LCD panel 11 and B/L unit 12 and improve the rigidity in the direction parallel to the display face 10a of the liquid crystal module 10.

A liquid crystal driver 15a is mounted on the printed wiring board 15. The liquid crystal driver 15a is a member for outputting a control signal through flexible board wiring 15b to the LCD panel 11 on the basis of image data inputted from an external device to control liquid crystal elements.

The B/L unit 12 has therein a fluorescent lamp 12a along its lower edge. The fluorescent lamp 12a is lighted by electric power supplied from a power source terminal 12b. The light emitted from the fluorescent lamp 12a is diffused upwards from the lower portion of the B/L unit 12, and reflected on a non-illustrated reflecting sheet. The light is emitted at a uniform brightness from the surface of the B/L unit 12 to the surface of the LCD panel 11. The light projected onto the LCD panel 11 is adjusted with the liquid crystal elements so that images or characters are displayed on the surface of the LCD panel 11.

When the liquid crystal module 10 is assembled, the printed wiring board 15 is fixed in the state that the flexible board wiring 15b is bent to be put between the B/L unit 12 and the back side frame 14.

As shown in FIG. 5, projected portions 10b are respectively placed at the upper and lower edges of the liquid crystal module 10 in such a manner that they are positioned at the four corners of the liquid crystal module 10 and are projected in the direction parallel to the display face 10a. A through-hole 10c is formed in each of the projected portions 10b so that the hole 10c extends through the portion 10b in the thickness direction of the liquid crystal module 10. The projected portions 10b are integrated with the backside frame 14, but may be integrated with the front side frame 13.

Figure 8:
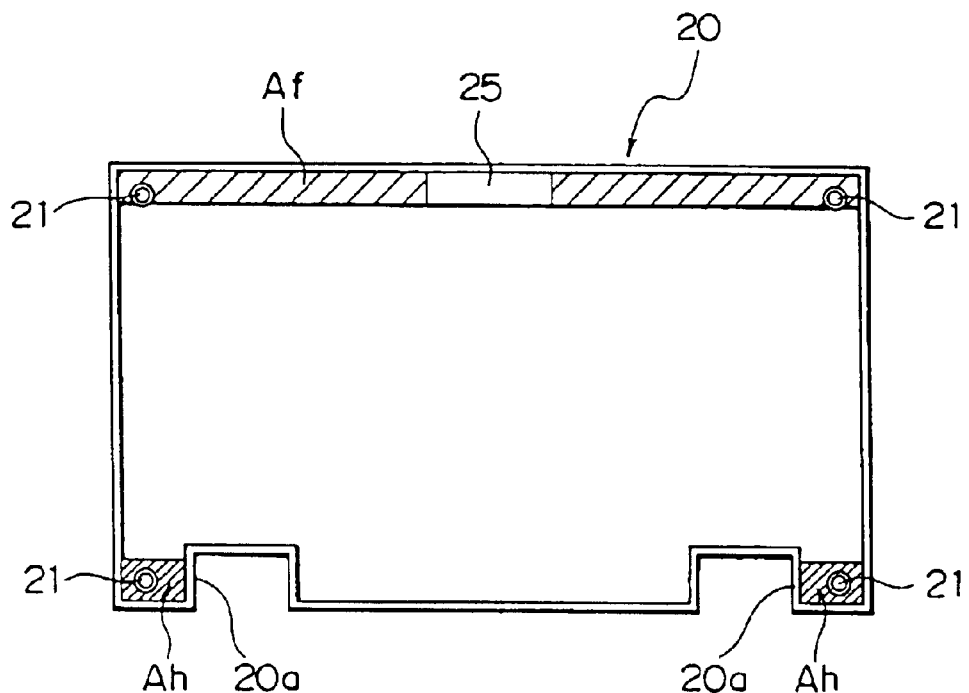
FIG. 8 is a plane view showing a space present in the cover shown in FIG. 5.

FIG. 8 is a view showing the bottom plate 20. In the bottom plate 20 and the outside frame 30, as a connecting portion for connecting these members 20 and 30, screw-receiving portions 20 are made at four corners of the bottom plate 20 and screw-passing holes 31 are made at four corners of the outside frame 30. Moreover, there are prepared screw members (connecting members) 40 that are passed through the screw-passing portions 31 and tightened into the screw-receiving portions 21.

Each of the screw-receiving portions 21 is integrated with the bottom plate 20 in the manner that the portion 21 is projected in the thickness direction of the liquid crystal module 10 from the bottom face of the plate 20. In the tip face of the portion 21, a hole 22 having a small diameter is made to receive and tighten the tip of a screw.

Figure 7A:
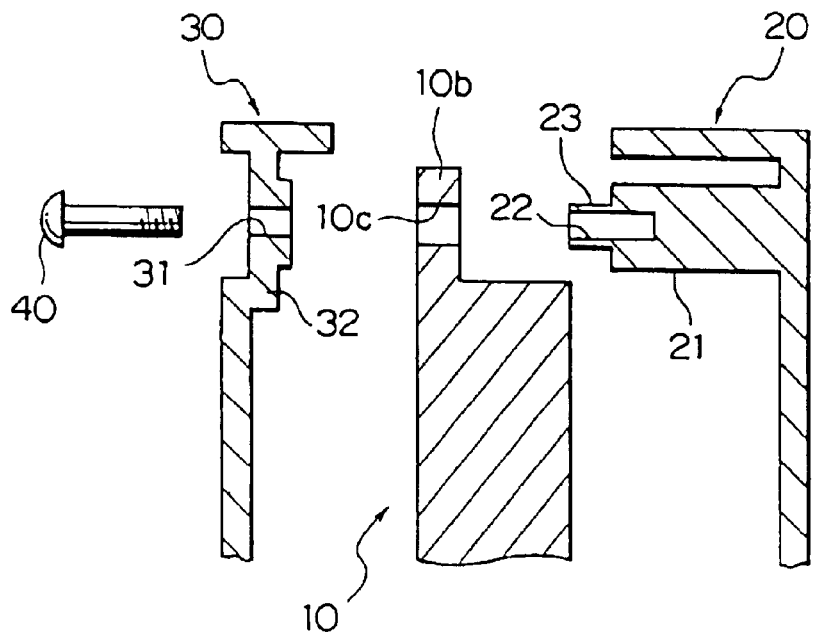
FIGS. 7A and 7B are vertically sectional views of a connection portion of a bottom plate and an outside frame shown in FIG. 5.
Figure 7B:
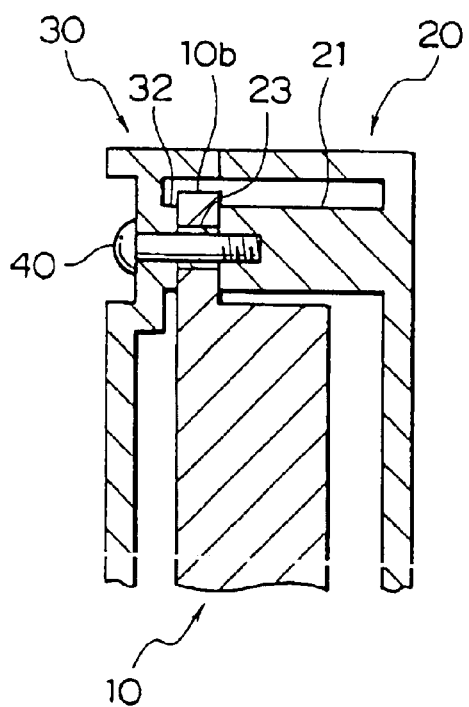

FIGS. 7A and 7B are vertically sectional views of the connection portion of the bottom plate 20 and the outside frame 30. In FIGS. 7A and 7B, the screw-receiving portion 21 is formed into a columnar form and a diameter-reduced portion 23 is made at its tip of the portion 21. The diameter of the diameter-reduced portion 23 is set to a slightly smaller than the diameter of the through-hole 10c of the liquid crystal module 10. The diameter-reduced portion 23 is fitted into the through-hole 10c.

A pushing portion 32, for pushing the projected portion 10b whose through-hole 10c is engaged with the diameter-reduced portion 23, is made at the inner side face of the outside frame 30, the face being opposite to the screw-receiving portion, in the manner that the periphery of the screw-passing hole 31 is swelled toward the inside.

Turning back to FIG. 5, chipped portions 20a and 30a are formed in the lower edges of the bottom plate 20 and the outside frame 30. A hinge metal member or fitting 20h for connecting a non-illustrated body of a computer and the cover rotatably may be fitted to the chipped portions 20a and 30a. The bottom plate 20 and the outside frame 30 are put on each other so that both of the chipped portions 20a and 30a are integrated with each other. In this way, the hinge metal member 20h is received in the integrated portions 20a and 30a.

The liquid crystal module 10, the bottom plate 20 and the outside frame 30 having the above-mentioned structures are heaped in the manner that the liquid crystal module 10 is put between the bottom plate 20 and the outside frame 30, and they are integrated as the cover by tightening the screw members 40 into the screw-receiving portions 21 through the screw-passing holes 31 and the through-holes 10c.

In the structure for mounting the liquid crystal module 10, which has the above-mentioned structure, the liquid crystal module 10, the bottom plate 20 and the outside frame 30 are integrated as the cover by tightening the screw members 40 into the screw-receiving portions 21 through the screw-passing holes 31 and the through-holes 10c. This makes it unnecessary to dispose screw-fixing portions or the like in the right and left edges of the liquid crystal module 10 as seen in the side-mount style in the prior art. Thus, it becomes possible to make the width in the right and left direction of the liquid crystal module 10 small. Since it is unnecessary to make any screw-fixing portion in the side faces of the bottom plate 20 and the outside frame 30, the width in the right and left direction of the external portion of the cover (that is, the chassis) can be made small.

When a notebook-type personal computer is kept in the state that it stands vertically in a bookshelf, it is desired that the height thereof is consistent with that of a document (for example, the long side of A4 size paper). That is, the width in the right and left direction of the chassis is restricted, and as the ratio of the display face 10a is higher within this restriction, its screen is easy to see. In the side-mount style in the prior art, the ratio of the display face 10a is restricted on the basis of the size necessary for fixing screws. On the other hand, in the present embodiment, the width of the outside frame can be made short (thin) so that the ratio of the display face 10a can be made higher. It is therefore possible to obtain a portable data terminal equipment wherein its screen is easy to see.

Since it is unnecessary that the wiring line of the LCD driver 15a is laid out so as to avoid the fixing portion of screws, the wiring line can be laid out in a more appropriate pattern.

As shown in FIG. 8, the following areas are necessarily disposed in a folding terminal such as a laptop computer: an area Af (shown by hatching) to which a hook portion 25 for keeping the body of the computer and the cover in a closed state is fixed; and an area Ah (shown by hatching) to which a hinge metal member 20h for connecting the body of the computer and the cover rotatably is fixed. Paying attention to the fact that there remains a spatial area for keeping a screw-tightening space, the cover can be made small by using this area. That is, the position where the screw member 40 is tightened, in the lower edge side of the cover, is present in the spatial area to which the hinge metal member 20h is fitted, so that the screw-tightening space does not get large. Thus, the cover does not become large. The position where the screw member is tightened in the upper edge of the cover is present in the spatial area beside the hook 25 for keeping the body of the computer and the cover in a closed state. For this reason, the screw-tightening space does not get large. Thus, the cover does not become large.

According to the above-mentioned structure, therefore, the area ratio of the display face 10a in the total area of the liquid crystal module 10 gets large, so that the area ratio of the display face 10a in the total area of the cover also gets large. This makes it possible to keep the display face 10a larger even when the size of the cover is restricted. Alternatively, when the liquid crystal module 10 whose display face 10a is large is adopted, the cover can be made small. In such a manner, the cover can be made compact.

Figure 9:
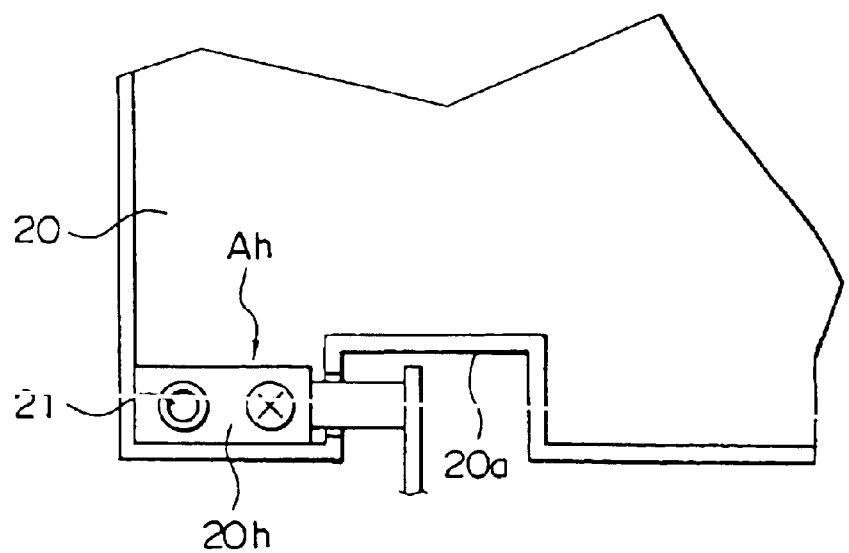
FIG. 9 is an enlarged view of a main portion of a connection portion with a body of a computer set in the cover shown in FIG. 5.

By passing the projected portion 23 through the through-hole 10c to engage with the projected portion 10b upon the assembly of the cover, it is possible to fit easily the position of the liquid crystal module 10 to the bottom plate 20 and tightening the screw member 40 from the side of the display face 10a. This makes it possible to improve working efficiency. Furthermore, as shown in FIG. 9, the hinge metal member 20h may be fixed with the screw member 40. In this case, the number of the assembling steps can be reduced still more to improve the working efficiency. Additionally, the strength of the fixed portion of the hinge metal member 20h can be raised. Thus, the connection portion can be made up not to be easily broken even when forcible opening and shutting are performed. Moreover, it is unnecessary that any screw-fixing portion is made at the end face of the cover, so that the bottom plate 20 and the outside frame 30 can be molded from a resin only by moving upper and lower molds once in the vertical direction. Thus, after the molding with the upper and lower molds, the step of sliding them is unnecessary, so that the number of the molding steps gets fewer. This makes it possible to simplify the producing process and reduce assembling costs.

According to a portable data terminal equipment on which the present structure for mounting a liquid crystal module, the size of the cover can be made small so that the terminal including the cover, itself, can be made compact. Since it is possible to improve working efficiency in the producing process and simplify the producing process, costs for producing products can be reduced.

Figure 10:
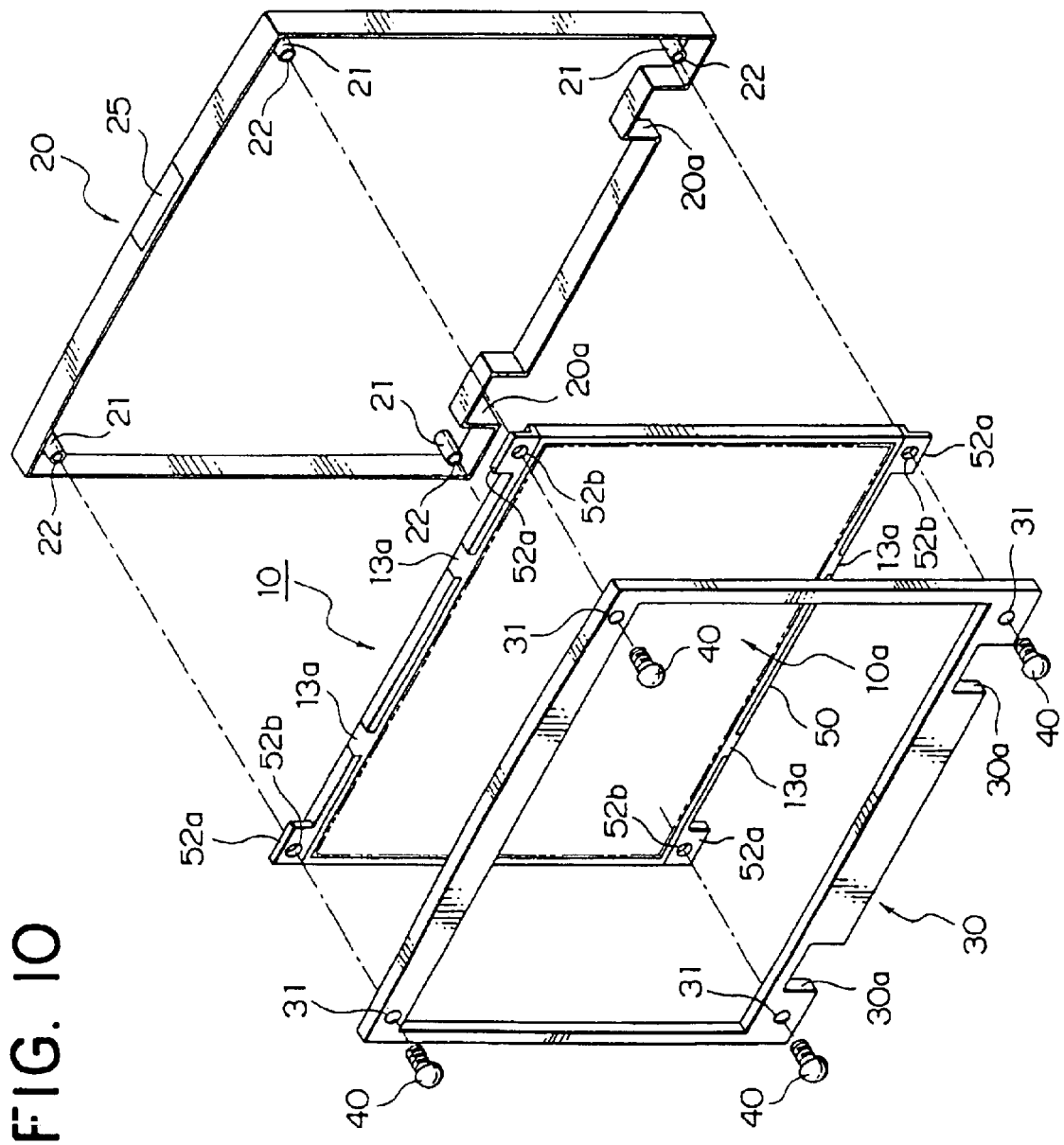
FIG. 10 is a view showing a second embodiment of the present invention, and is a perspective disassembly view of a cover, with a built-in display device, which a portable data terminal equipment has.

The following will describe a structure for mounting a liquid crystal module according to a second embodiment of the present invention, and a portable data terminal equipment on which this structure is mounted, referring to FIG. 10. The same reference numbers are attached to the same elements as already described in the first embodiment, and the explanation thereof is omitted.

FIG. 10 is a perspective disassembly view of a cover, with a built-in display device, which a laptop computer has. In FIG. 10, reference numbers 50 represent reinforcing members for raising the rigidity along the face direction of the liquid crystal module 10.

Tongue-like pieces 13a, which are obtained by cutting two parts of each of end faces constituting upper and lower edges and raising the parts, are present at two points that are separated in the horizontal width direction of the display face 10a. The reinforcing members 50 are made of a metal in the same as the front side frame 13 and the like, are arranged along the upper and lower edges of the liquid crystal module 10, and are put between the edges by tightening the tongue-like pieces 13a, to be fixed to the liquid crystal module 10.

Projected portions 52a, which are projected in the direction parallel to the display face 10a, are made at both ends of the reinforcing member 50. Respective projected portions 52a are positioned at four corners of the liquid crystal module 10. Trough-holes 52b are formed in the respective projected portions 52a. The through-holes 52b extend through the portions 52a in the thickness direction of the liquid crystal module 10.

The liquid crystal module 10 having the above-mentioned stricture is put between the bottom plate 20 and the outside frame 30, and they are heaped. They are integrated as the cover by tightening the screw members 40 to the screw-receiving members 21 through the screw-passing holes 31 and the through-holes 52a.

In the structure for mounting the liquid crystal module 10, which has the above-mentioned structure, the liquid crystal module 10, the bottom plate 20 and the outside frame 30 are integrated as the cover by tightening the screw members 40 into the screw-receiving portions 21 through the screw-passing holes 31 and the through-holes 52b. Thus, it becomes possible to make the width in the right and left direction of the liquid crystal module 10 small.

According to the above-mentioned structure, therefore, the area ratio of the display face 10a in the total area of the liquid crystal module 10 gets large, so that the cover can be made compact.

When the cover is assembled, the tightening work of the screw members 40 can be performed from the side of display face 10a of the liquid crystal module 10. This makes it possible to improve working efficiency upon the assembly of the cover from the liquid crystal module 10, the bottom plate 20 and the outside frame 30 and reduce costs for producing products.

In the present embodiment, the reinforcing members 50 are fitted to the upper and lower edges of the liquid crystal module 10, so as to raise the rigidity along the face direction, especially the horizontal width direction, of the liquid crystal module 10. Thus, the liquid crystal module 10 is not easily distorted or destroyed. Thus, the rigidity is kept even when the frame of the liquid crystal module 10 is made thin. For this reason, the total weight of the liquid crystal module 10 can be made smaller than, for example, that of the first embodiment. The rigidity necessary and sufficient for the whole cover can be kept even when the rigidity of the bottom plate 20 and the outside frame 30 is made low. Therefore, the bottom plate 20 and the outside frame 30 can be made of a light plastic so that the cover can be made light. Moreover, the cover can give high rigidity.

By tightening the reinforcing members 50 to the liquid crystal module 10, it is unnecessary to lay out signal wiring of the LCD driver 15a to keep away from screw-fixing portions. Thus, the signal wiring can be laid out into a more appropriate form. Metal pieces such as scraps of the screws are not produced from the screw-fixing portions. Thus, there does arise a problem that the metal pieces adhere to the printed wiring board 15 and the flexible wiring substrate 15a, thereby shorting electrical circuits to cause wrong operation of the device. The reinforcing members 50 are thinner (shorter) than screw-inserting/tightening portions. Therefore, the ratio of the display face 10a can be made larger by this.

In the present embodiment, the reinforcing members 50 are fixed to be put between the tongue-like pieces 13a made at the front side frame 13. However, the tongue-like pieces may be made at the backside frame 14. The reinforcing members 50 may be welded to the front side frame 13 or the backside frame 14. In this case, the welding may be spot-welding or whole-welding.

Figure 11:
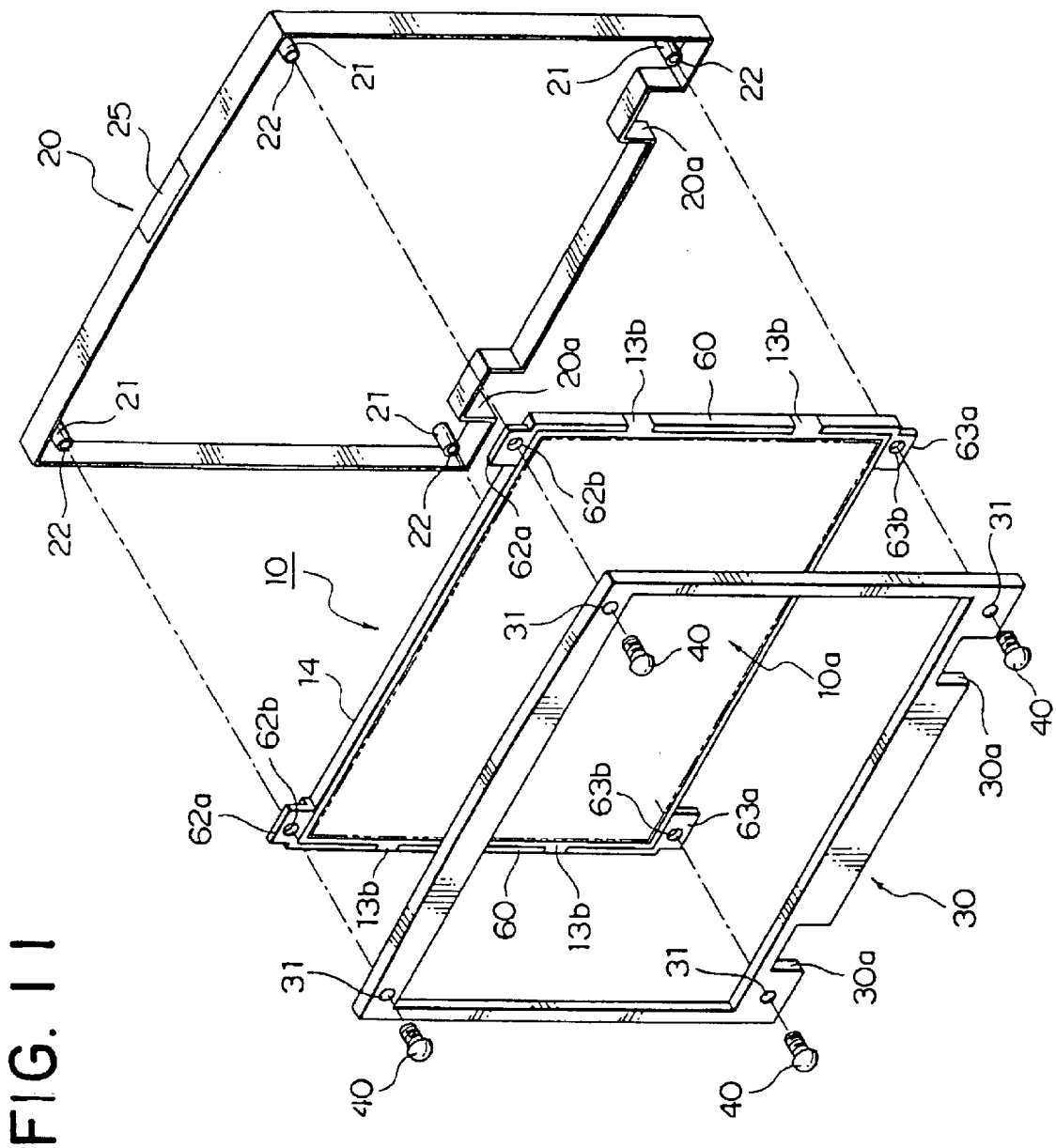
FIG. 11 is a view showing a third embodiment of the present invention, and is a perspective disassembly view of a cover, with a built-in display device, which a portable data terminal equipment has.

The following will describe a structure for mounting a liquid crystal module according to a third embodiment of the present invention, and a portable data terminal equipment on which this structure is mounted, referring to FIG. 11. The same reference numbers are attached to the same elements as already described in the first and second embodiments, and the explanation thereof is omitted.

FIG. 11 is a perspective disassembly view of a cover, with a built-in display device, which a laptop computer has. In FIG. 11, reference numbers 60 represent reinforcing members for raising the rigidity along the face direction of the liquid crystal module 10.

Tongue-like pieces 13b, which are obtained by cutting two parts of each of end faces constituting right and left edges of the liquid crystal module 10 and raising the parts, are present at two points that are separated in the vertical width direction of the display face 10a. The reinforcing members 60 are made of a metal in the same as the front side frame 13 and the like, are arranged along the right and left edges of the liquid crystal module 10, and are put between the edges by tightening the tongue-like pieces 13a, to be fixed to the liquid crystal module 10.

The upper end of the reinforcing member 60 is bent toward the inside so as to be along the upper edge of the liquid crystal module 10, and at the tip thereof a projected portion 62a, which is projected in the direction parallel to the display face 10a, is made. The lower end of the reinforcing member 60 is bent toward the inside so as to be along the lower edge of the liquid crystal module 10, and at the tip thereof a projected portion 63a, which is projected in the direction parallel to the display face 10a, is formed in the same way as in the upper end.

Trough-holes 62b and 63b are formed in the respective projected portions 62a and 63a. The through-holes 62b and 63b extend through the portions 62a and 63a in the thickness direction of the liquid crystal module 10.

The liquid crystal module 10 having the above-mentioned stricture is put between the bottom plate 20 and the outside frame 30 and they are heaped. They are integrated as the cover by tightening the screw members 40 to the screw-receiving members 21 through the screw-passing holes 31 and the through-holes 62b or 63b.

In the structure for mounting the liquid crystal module 10, which has the above-mentioned structure, the liquid crystal module 10, the bottom plate 20 and the outside frame 30 are integrated as the cover by tightening the screw members 40 into the screw-receiving portions 21 through the screw-passing holes 31 and the through-holes 62b or 63b.

According to the above-mentioned structure, therefore, at the time of assembling the cover, the tightening work of the screw members 40 can be performed from the side of display face 10a of the liquid crystal module 10. This makes it possible to improve working efficiency and reduce costs for producing products.

In the present embodiment, the reinforcing members are fitted to the right and left edges of the liquid crystal module 10, so as to raise the rigidity along the face direction, especially the vertical width direction, of the liquid crystal module 10. Thus, the liquid crystal module 10 is not easily distorted or destroyed. Thus, the rigidity is kept even when the frame of the liquid crystal module 10 is made thin. For this reason, the total weight of the liquid crystal module 10 can be made smaller than, for example, that of the first embodiment. The rigidity necessary and sufficient for the whole cover can be kept even when the rigidity of the bottom plate 20 and the outside frame 30 is made low. Therefore, the bottom plate 20 and the outside frame 30 can be made of a light plastic so that the cover can be made light. Moreover, the cover can give higher rigidity. The reinforcing members 50 are thinner (shorter) than screw-inserting/tightening portions. concerning the horizontal direction of the cover, therefore, the ratio of the display face 10a can be made larger than the prior art.

Figure 12:
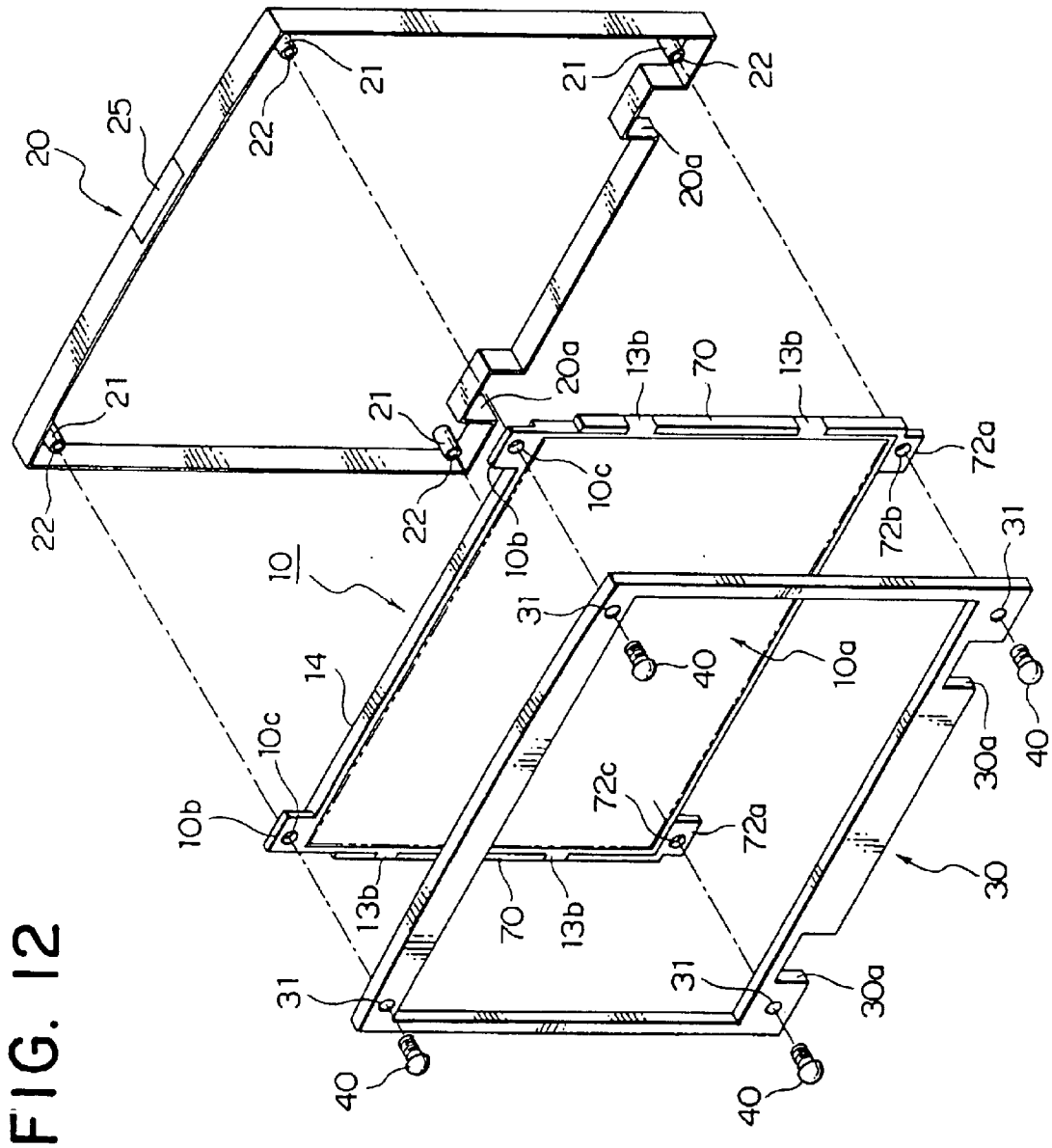
FIG. 12 is a view showing a fourth embodiment of the present invention, and is a perspective disassembly view of a cover, with a built-in display device, which a portable data terminal equipment has.
Figure 13:
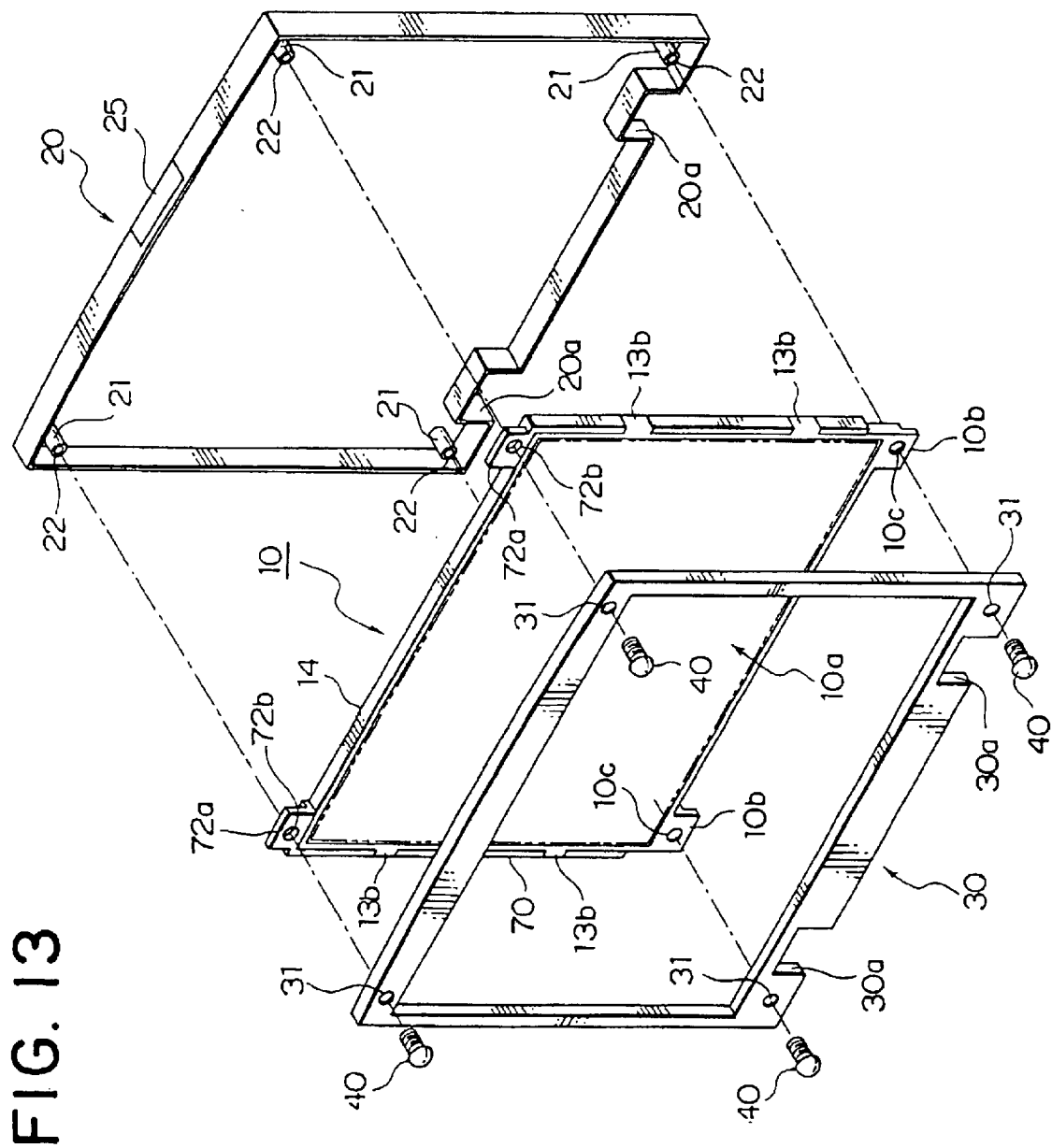
FIG. 13 is a perspective disassembly view of a modification of the cover shown in FIG. 10.

The following will describe a structure for mounting a liquid crystal module according to a fourth embodiment of the present invention, and a portable data terminal equipment on which this structure is mounted, referring to FIGS. 12 and 13. The same reference numbers are attached to the same elements as already described in the first to third embodiments, and the explanation thereof is omitted.

FIG. 12 is a perspective disassembly view of a cover, with a built-in display device, which a laptop computer has. In FIG. 12, reference numbers 70 represent reinforcing members for raising the rigidity along the face direction of the liquid crystal module 10.

The projected portions 10b, which are positioned at both corners of the liquid crystal module 10 and are projected in the direction parallel to the display face 10a, are integrated with the back side frame 14 at the upper edge of the liquid crystal module 10. Trough-holes 10c are formed in the projected portions 10b. The through-holes 10c extend through the portions 10b in the thickness direction of the liquid crystal module 10.

The reinforcing members 70 are made of a metal in the same as the front side frame 13 and the like, are arranged along the right and left edges of the liquid crystal module 10, and are put between the edges by tightening the tongue-like pieces 13b, to be fixed to the liquid crystal module 10.

The lower end of the reinforcing member 70 is bent toward the inside so as to be along the lower edge of the liquid crystal module 10, and at the tip thereof a projected portion 72a, which is projected in the direction parallel to the display face 10a, is made. Trough-holes 72b are formed in the respective projected portions 72a. The through-holes 72b extend through the portions 72a in the thickness direction of the liquid crystal module 10.

The liquid crystal module 10 having the above-mentioned stricture is put between the bottom plate 20 and the outside frame 30 and they are heaped. They are integrated as the cover by tightening the screw members 40 to the screw-receiving members 21 through the screw-passing holes 31 and the through-holes 10c or 72b.

In the structure for mounting the liquid crystal module 10, which has the above-mentioned structure, the liquid crystal module 10, the bottom plate 20 and the outside frame 30 are integrated as the cover by tightening the screw members 40 into the screw-receiving portions 21 through the screw-passing holes 31 and the through-holes 10c or 72b. Thus, it becomes possible to make the width in the right and left direction of the liquid crystal module 10 small.

According to the above-mentioned structure, therefore, the area ratio of the display face 10a in the total area of the liquid crystal module 10 gets large, so that the cover can be made compact.

At the time of assembling the cover, the tightening work of the screw members 40 can be performed from the side of display face 10a of the liquid crystal module 10. This makes it possible to improve working efficiency and reduce costs for producing products.

In the present embodiment, the reinforcing members 70 are fitted to the right and left edges of the liquid crystal module 10, so as to raise the rigidity along the face direction, especially the vertical width direction, of the liquid crystal module 10. Thus, the liquid crystal module 10 is not easily distorted or destroyed. Thus, the rigidity is kept even when the frame of the liquid crystal module 10 is made thin. For this reason, the total weight of the liquid crystal module 10 can be made smaller than, for example, that of the first embodiment. The rigidity necessary and sufficient for the whole cover can be kept even when the rigidity of the bottom plate 20 and the outside frame 30 is made low. Therefore, the bottom plate 20 and the outside frame 30 can be made of a light plastic so that the cover can be made light. Moreover, the cover can give high rigidity one projected portion of the reinforcing member 70 is removed, and the projected portion 10b made of thin metal and integrated with the frame of the liquid crystal module 10 is formed. Therefore, the liquid crystal module 10 can be made lighter without damaging its rigidity than, for example, the third embodiment.

The present embodiment is one example wherein the projected portion 10b integrated with the liquid crystal module 10 is arranged at the upper edge side of the liquid crystal module 10 and the projected portion 72a integrated with the reinforcing member 70 is arranged at the lower edge side thereof. As shown in FIG. 13, however, the same effect can be obtained if the projected portion 10b is arranged at the lower edge side of the liquid crystal module 10 and the projected portion 72a is arranged at the upper edge side thereof. The reinforcing member 70 can be fitted to the liquid crystal module 10 regardless of the size of the module 10. In the case of producing various kinds of products, the number of parts can be reduced.

Figure 14:
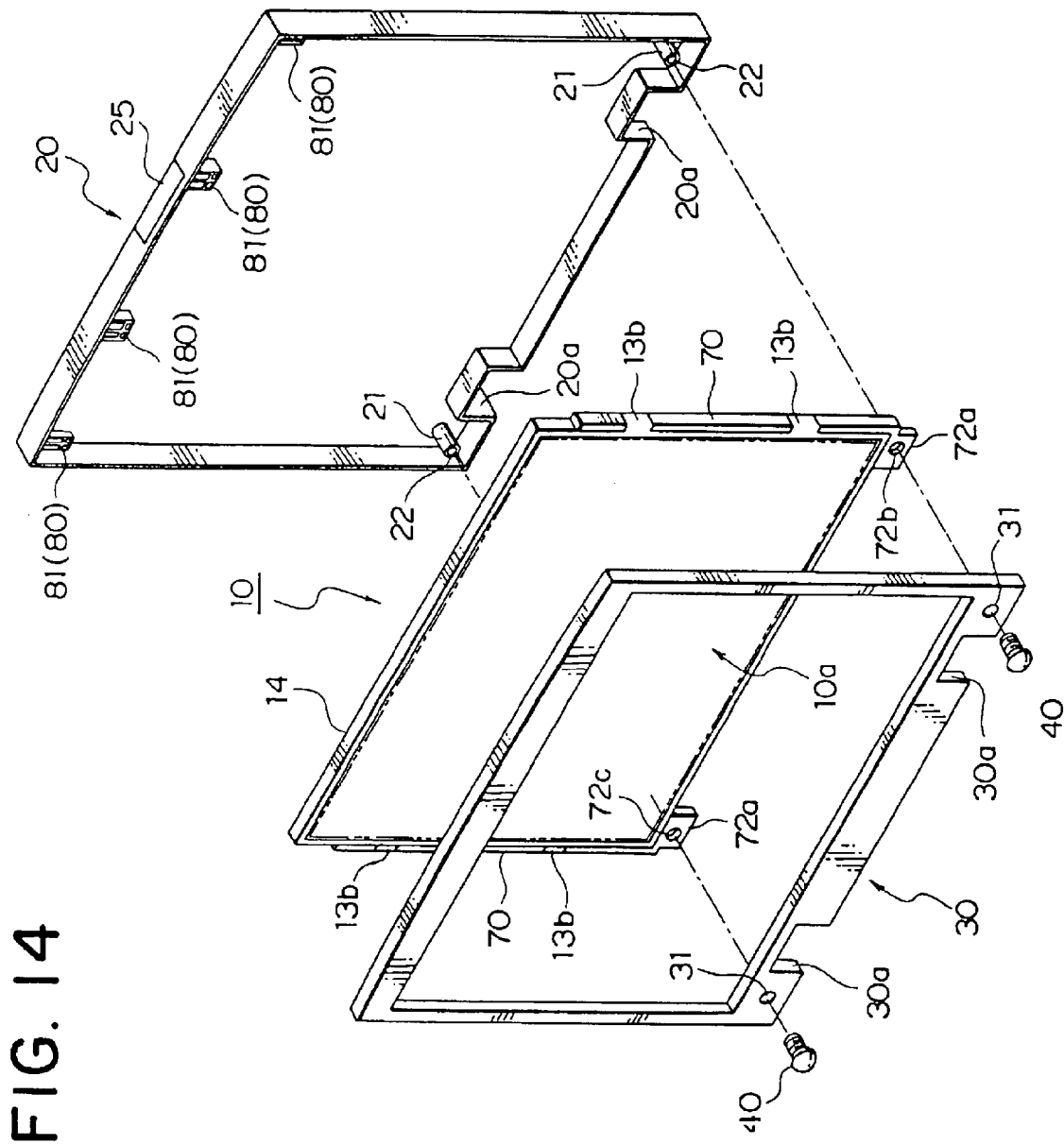
FIG. 14 is a view showing a fifth embodiment of the present invention, and is a perspective disassembly view of a cover, with a built-in display device, which a portable data terminal equipment has.

The following will describe a structure for mounting a liquid crystal module according to a fifth embodiment of the present invention, and a portable data terminal equipment on which this structure is mounted, referring to FIGS. 14 and 15. The same reference numbers are attached to the same elements as already described in the first to fourth embodiments, and the explanation thereof is omitted.

FIG. 14 is a perspective disassembly view of a cover, with a built-in display device, which a laptop computer has. In FIG. 14, reference numbers 80 represent holding mechanisms for holding a liquid crystal module between the bottom plate 20 and the outside frame 30.

In the same manner as in the fourth embodiment, the reinforcing members 70 are fixed onto end faces, which constitute right and left edges, in the liquid crystal module 10. A through-hole 72b is formed in the projected portion 72a disposed at the reinforcing member 70.

The holding mechanism 80 is composed of a rib 81 which is arranged at the side of the bottom plate 20 and contacts the liquid crystal module 10, and a rib 82 (non-illustrated in FIG. 14) which is arranged at the side of the outside frame 30 and contacts the liquid crystal module 10 from the side opposite to the rib 81.

A plurality of the ribs 81 are separately disposed at the inner side of the bottom plate 20 and along the upper edge thereof. The upper faces of the ribs 81 are formed in parallel to the face direction of the bottom plate 20, that is, the face direction of the liquid crystal module 10. The insides of the ribs 81 are hollow to make the bottom plate 20 light.

A plurality of the ribs 82 are separately disposed at the inner side of the outside frame 30 and at the positions corresponding to the respective ribs 81. The upper faces of the ribs 82 are formed in parallel to the face direction of the liquid crystal module 10 in the same way as the ribs 81. The insides thereof are hollow to make the outside frame 30 light.

Figure 15A:
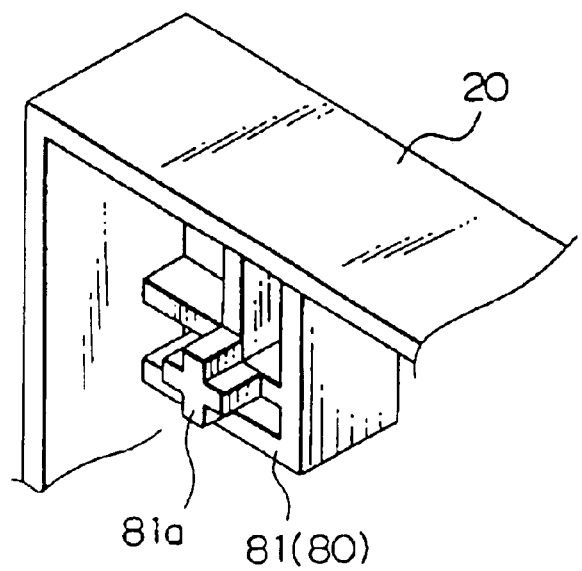
FIGS. 15A and 15B are vertically sectional views showing a fitting state of a projection portion and a concave portion shown in FIG. 12.
Figure 15B:
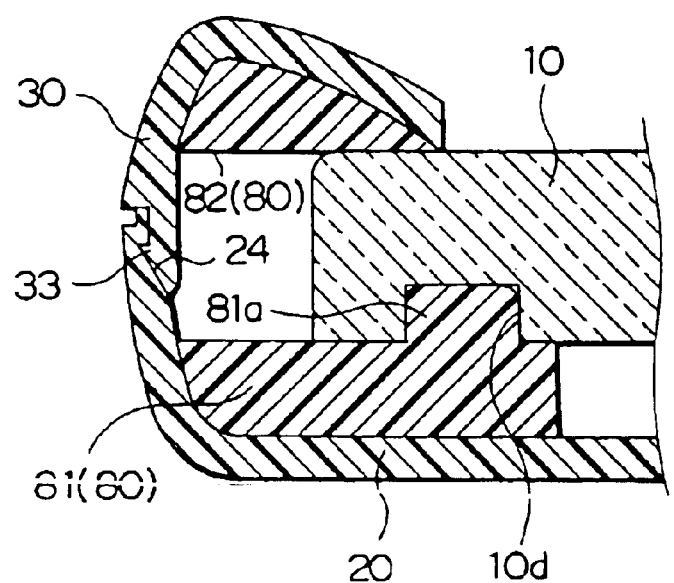

A cross-shaped projection 81a is formed on the front face of the rib 81. As shown in FIGS. 15A and 15B, a concave 10d, to which the projection 81a is fitted, is made at the position corresponding to the projection 81a. A concave 24 is formed in the upper edge of the bottom plate 20 and further a nail 33, which is engaged with the concave 24, is located in the outside frame 30. The two are engaged with each other by overlaying one of the bottom plate 20 and the outside frame 30 on the other thereof.

The liquid crystal module 10, the bottom plate 20 and the outside frame 30, which have the above-mentioned structure, are integrated as the cover by heaping them so as to put the liquid crystal module 10 between the bottom plate 20 and the outside frame 30, tightening the screw members 40 into the screw-receiving portions 21 through the screw-passing holes 31 and the through-holes 72b, and sandwiching the upper edge of the liquid crystal module 10 between the ribs 81 and 82.

In the structure for mounting the liquid crystal module 10, which has the above-mentioned structure, the liquid crystal module 10, the bottom plate 20 and the outside frame 30 are integrated as the cover by tightening the screw members 40 into the screw-receiving portions 21 through the screw-passing holes 31 and the through-holes 72b and sandwiching the upper edge of the liquid crystal module 10 between the ribs 81 and 82. By this, positions at which screws are tightened are reduced to two positions.

According to the above-mentioned structure, therefore, the area ratio of the display face 10a in the total area of the liquid crystal module 10 gets large, so that the cover can be made compact.

At the time of assembling the cover, the tightening work of the screw members 40 can be performed from the side of display face 10a of the liquid crystal module 10. This makes it possible to improve working efficiency and reduce costs for producing products.

In the present embodiment, the reinforcing members 70 are fitted to the right and left edges of the liquid crystal module 10, so as to raise the rigidity along the face direction, especially the vertical width direction, of the liquid crystal module 10. Thus, the liquid crystal module 10 is not easily distorted or destroyed. Thus, the rigidity is kept even when the frame of the liquid crystal module 10 is made thin. For this reason, the total weight of the liquid crystal module 10 can be made smaller than, for example, that of the first embodiment. The rigidity necessary and sufficient for the whole cover can be kept even when the rigidity of the bottom plate 20 and the outside frame 30 is made low. Therefore, the bottom plate 20 and the outside frame 30 can be made of a light plastic so that the cover can be made light. Moreover, the cover can give high rigidity. Any projected portion made of a metal is removed and the liquid crystal module 10 is sandwiched between the plastic ribs 81 and 82. For this reason, the liquid crystal module 10 of the present embodiment can be made lighter than, for example, that of the fourth embodiment by the weight of the projected portions.

Specific structures of the present invention are not restricted to the first to the fifth embodiments, which are in detail described with reference to the respective drawings. Modifications and variations may be performed within the scope of the subject matter of the present invention.

In the respective embodiments, the present invention is applied to a laptop computer. The present invention can be however applied to other portable data terminal equipments using a liquid crystal module as a display means, for example, note-size personal computer, or the like.

What is claimed is:

1. A structure for mounting a rectangular liquid crystal module on a cover that covers at least one face of a body of a portable data terminal or information processing equipment, comprising:

a bottom plate which is put on the back side of a display face of the liquid crystal module;

an outside frame which is put on the front side of the display face of the liquid crystal module and has an opening from which the display face can be exposed;

a projected portions for fitting the liquid crystal module between the bottom plate and the outside frame, at least one projected portion of the projected portions being made in an upper edge of the liquid crystal module and at least one projected portion of the projected portions being made in a lower edge of the liquid crystal module so as to be projected in the direction parallel to the display face;

at least two through-holes which are formed in the projected portions and extend through the projected portions in the thickness direction of the liquid crystal module; and a connection portion which is formed in the bottom plate and the outside frame and connects the two through the at least two through-holes when the bottom plate is put on the back side of the display face of the liquid crystal module and when the outside frame is put on the front side of the display face of the liquid crystal module, a first part of the connection portion being located in a first area, a hinge metal member connecting the body of the portable data terminal or information processing equipment and the cover in the first area.

2. The structure for mounting the liquid crystal module according to claim 1, wherein a reinforcing member is fitted to the liquid crystal module along its edge and the projected portions are formed in the reinforcing member.

3. The structure for mounting the liquid crystal module according to claim 1, wherein the upper and lower edges of the liquid crystal module are sandwiched between the bottom plate and the outside frame to be fixed.

4. The structure for mounting the liquid crystal module according to claim 1, wherein the connection portion has a projected portion that is disposed at one of the bottom plate and the outside frame and fitted into each of the at least two through-holes, and a connection portion that is disposed at the other of the bottom plate and the outside frame and is connected to the projected portion.

5. The structure for mounting the liquid crystal module according to claim 1, comprising at least two screw members that are inserted from either one of the bottom plate and the outside frame so as to be tightened to the other.

6. A portable data terminal or information processing equipment which comprises:
- a cover that covers at least one face of a body of said equipment;
- a rectangular liquid crystal module built in said cover; and
- a mounting portion for mounting said liquid crystal module on said cover, said mounting portion comprising:
  - a bottom plate which is put on the back side of a display face of the liquid crystal module;
  - an outside frame which is put on the front side of the display face of the liquid crystal module and has an opening from which the display face can be exposed;
  - a projected portions for fitting the liquid crystal module between the bottom plate and the outside frame,
  - at least one projected portion of the projected portions being made in an upper edge of the liquid crystal module and at least one projected portion of the projected portions being made in a lower edge of the liquid crystal module so as to be projected in the direction parallel to the display face;
  - at least two through-holes which are formed in the projected portions and extend through the projected portions in the thickness direction of the liquid crystal module; and
  - a connection portion which is formed in the bottom plate and the outside frame and connects the two through the at least two, through-holes when the bottom plate is put on the back side of the display face of the liquid crystal module and when the outside frame is put on the front side of the liquid crystal module,
  - a first part of the connection portion being located in a first area, a hinge metal member connecting said body of said equipment and said cover in the first area.

7. The portable data terminal equipment according to claim 6, comprising a reinforcing member fitted to the liquid crystal module along its edge and the projected portions are formed in the reinforcing member.

8. The portable data terminal equipment according to claim 6, wherein the upper and lower edges of the liquid crystal module are sandwiched between the bottom plate and the outside frame to be fixed.

9. The portable data terminal equipment according to claim 6, wherein said connection portion has a projected portion that is disposed at one of the bottom plate and the outside frame and fitted into each of the at least two through-holes, and a connection portion that is disposed at the other of the bottom plate and the outside frame and is connected to the projected portion.

10. The portable data terminal equipment according to claim 6, comprising at least two screw member hats that are inserted from either one of the bottom plate and the outside frame so as to be tightened to the other.

11. The structure for mounting the liquid crystal module according to claim 1, wherein a second part of the connection portion is located in a second area to which a hook portion is fixed, the hook portion keeping the body of the portable data terminal or information processing equipment and the cover in a closed state.

12. The structure for mounting the liquid crystal module according to claim 1, wherein the hinge metal member is fixed by a screw member inserted through one of the at least two through-holes.

13. The portable data terminal equipment according to claim 6, wherein a second part of the connection port is located in a second area to which a hook port is fixed, the hook portion keeping said equipment and said cover in a closed state.

14. The portable data terminal equipment according to claim 6, wherein the hinge metal member is fixed by a screw member inserted through one of the at least two through-holes.

* * * * *